США012450696B2

United States Patent
Kim et al.

(10) Patent No.: US 12,450,696 B2
(45) Date of Patent: Oct. 21, 2025

(54) METHOD AND APPARATUS WITH IMAGE PROCESSING FOR PROCESSING DEPTH IMAGES

(71) Applicant: SAMSUNG ELECTRONICS CO., LTD., Suwon-si (KR)

(72) Inventors: Heewon Kim, Seoul (KR); Seon Min Rhee, Seoul (KR); Jihye Kim, Anyang-si (KR); Seungju Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 753 days.

(21) Appl. No.: 17/383,346

(22) Filed: Jul. 22, 2021

(65) Prior Publication Data

US 2022/0188987 A1    Jun. 16, 2022

(30) Foreign Application Priority Data

Dec. 15, 2020    (KR) .................. 10-2020-0175858

(51) Int. Cl.
*G06T 5/70*    (2024.01)
*G06N 3/045*    (2023.01)
(Continued)

(52) U.S. Cl.
CPC ............... *G06T 5/70* (2024.01); *G06N 3/045* (2023.01); *G06N 3/08* (2013.01); *G06T 5/50* (2013.01);
(Continued)

(58) Field of Classification Search
CPC .... G06T 5/70; G06T 5/50; G06T 5/73; G06T 2207/10028; G06T 2207/20084;
(Continued)

(56) References Cited

U.S. PATENT DOCUMENTS 9,805,294 B2    10/2017    Liu et al.
10,311,378 B2    6/2019    Nowozin et al.
(Continued)

FOREIGN PATENT DOCUMENTS

CN    103927717 A    7/2014
CN    105825484 A    8/2016
(Continued)

OTHER PUBLICATIONS

Michalkiewicz, Mateusz, et al. "Implicit Surface Representations As Layers in Neural Networks." 2019 IEEE/CVF International Conference on Computer Vision (ICCV). IEEE, 2019. (Year: 2019).*
(Continued)

*Primary Examiner* — Leon Viet Q Nguyen
(74) *Attorney, Agent, or Firm* — NSIP Law (57) ABSTRACT

A method with image processing includes: generating a first surface normal image comprising surface normal vectors corresponding to pixels of a first depth image; and applying the first depth image and the first surface normal image to a first neural network, and acquiring a second depth image by changing the first depth image using the first neural network. The first neural network generates the second depth image to have an improved quality compared to the first depth image, based on an embedding vector that comprises a feature of the first depth image and a feature of the first surface normal image.

24 Claims, 7 Drawing Sheets

(51) Int. Cl.
  *G06N 3/08*   (2023.01)
  *G06T 5/50*   (2006.01)
  *G06T 5/73*   (2024.01)

(52) U.S. Cl.
  CPC ...... *G06T 5/73* (2024.01); *G06T 2207/10028* (2013.01); *G06T 2207/20081* (2013.01); *G06T 2207/20084* (2013.01)

(58) Field of Classification Search
  CPC . G06T 5/60; G06T 2207/20192; G06T 7/596; G06T 7/593; G06T 7/543; G06N 3/045
  See application file for complete search history.

(56) References Cited

U.S. PATENT DOCUMENTS

| | | | |
|---|---|---|---|
| 11,238,604 B1* | 2/2022 | Baig | G06N 20/00 |
| 2016/0379041 A1* | 12/2016 | Rhee | G06V 10/32 |
| | | | 382/118 |
| 2017/0262768 A1 | 9/2017 | Nowozin et al. | |
| 2018/0129973 A1 | 5/2018 | Nowozin et al. | |
| 2020/0410741 A1* | 12/2020 | Laflamme | G06T 3/4053 |
| 2022/0156971 A1* | 5/2022 | Guizilini | G06T 7/74 |

FOREIGN PATENT DOCUMENTS

| | | |
|---|---|---|
| CN | 107578436 A | 1/2018 |
| CN | 107679477 A | 2/2018 |
| CN | 108885701 A | 11/2018 |
| CN | 108961184 A | 12/2018 |
| CN | 109785243 A | 5/2019 |
| CN | 109859147 A | 6/2019 |
| EP | 3 629 240 A2 | 1/2020 |
| JP | 2019-211391 A | 12/2019 |

OTHER PUBLICATIONS

Xu et al ("Depth completion from sparse lidar data with depth-normal constraints" In Proceedings of the IEEE/CVF International Conference on Computer Vision (pp. 2811-2820), 2019) (Year: 2019).*

Baruhov, et al. "Unsupervised enhancement of real-world depth images using tri-cycle gan." arXiv preprint arXiv:2001.03779 (Jan. 11, 2020) pp. 1-10.

Jeon, et al. "Reconstruction-based pairwise depth dataset for depth image enhancement using CNN." *Proceedings of the European Conference on Computer Vision (ECCV)*. 2018 pp. 438-454.

Zhang, et al. "Fast depth image denoising and enhancement using a deep convolutional network." *2016 IEEE international conference on acoustics, speech and signal processing (ICASSP)*. IEEE, Mar. 20-25, 2016 pp. 2499-2503.

Su, et al. "Deep end-to-end time-of-flight imaging." *Proceedings of the IEEE Conference on Computer Vision and Pattern Recognition*. 2018 pp. 6383-6392.

Extended European Search Report issued May 3, 2022 in counterpart European Patent Application No. 21206504.9. (5 pages in English).

Xu, Yan et al., "Depth Completion from Sparse LiDAR Data with Depth-Normal Constraints," IEEE/CVF International Conference on Computer Vision (ICCV), Oct. 2019, (pp. 2811-2820).

European Office Action Issued on Mar. 2, 2023, in counterpart European Patent Application No. 21206504.9 (17 Pages in English).

Agresti, Gianluca, et al. "Unsupervised Domain Adaptation for ToF Data Denoising with Adversarial Learning." Proceedings of the IEEE/CVF Conference on Computer Vision and Pattern Recognition, 2019 (10 pages in English).

Chinese Office Action issued on Aug. 16, 2025, in corresponding Chinese Patent Application No. 202110857568.5. (9pages in English, 7pages in Chinese).

* cited by examiner

METHOD AND APPARATUS WITH IMAGE PROCESSING FOR PROCESSING DEPTH IMAGES

CROSS-REFERENCE TO RELATED APPLICATIONS

This application claims the benefit under 35 USC § 119(a) of Korean Patent Application No. 10-2020-0175858, filed on Dec. 15, 2020 in the Korean Intellectual Property Office, the entire disclosure of which is incorporated herein by reference for all purposes.

BACKGROUND

1. Field

The following description relates to a method and apparatus for processing an image. For example, the description related to a method and apparatus for processing a three-dimensional (3D) depth image.

2. Description of Related Art

A depth image is a three-dimensional (3D) image including information on a distance between a camera and a subject and may be acquired by a depth camera that measures the distance between the subject and the camera, such as a time-of-flight (TOF) camera.

A TOF method is a method of measuring a distance by shooting strong light from the camera in front and then detecting the reflected light. A TOF-type camera may project light of a specific wavelength (e.g., a near-infrared ray of 850 nanometers (nm)) to a subject using a light-emitting diode (LED) or a laser diode (LD), measure or photograph light of the same wavelength reflected from the subject with a photodiode or camera, and calculate a phase difference between an irradiated light signal and a signal of the light reflected from the subject and returned for an integration time every frame, thereby generating a depth image.

At this time, if the camera or subject moves for a shorter period of time than the integration time, the reflected light signal may be changed in phase. In this case, a depth measurement error may occur due to an external environment and imaging conditions including a material, color, a distance, and lighting of an object to be imaged. To solve this problem, techniques for correcting a depth image, such as a weighted least squares (WLS) filter for removing noise from a depth image acquired by the TOF camera, are being developed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method with image processing includes: generating a first surface normal image including surface normal vectors corresponding to pixels of a first depth image; and applying the first depth image and the first surface normal image to a first neural network, and acquiring a second depth image by changing the first depth image using the first neural network. The first neural network generates the second depth image to have an improved quality compared to the first depth image, based on an embedding vector that includes a feature of the first depth image and a feature of the first surface normal image.

The first neural network may remove noise included in the first depth image and increase a sharpness of the first depth image.

The first depth image may include a time-of-flight (TOF) image.

The method may further include: generating a second surface normal image including surface normal vectors corresponding to pixels corresponding to the second depth image; and applying the second depth image and the second surface normal image to a second neural network, and acquiring a third depth image by changing the second depth image using the second neural network. The second neural network may generate the third depth image having a degraded quality compared to the second depth image, based on an embedding vector that includes a feature of the second depth image and a feature of the second surface normal image.

The image processing method may further include: generating training data by pairing the second depth image and the third depth image.

The first neural network and the second neural network may be trained based on a cycle-generative adversarial network (GAN) training method.

In another general aspect, a non-transitory computer-readable storage medium stores instructions that, when executed by a processor, cause the processor to perform the method described above.

In another general aspect, a training method includes: acquiring a second depth image of a second type by applying a first depth image of a first type and a first surface normal image corresponding to the first depth image to a first neural network; acquiring a third depth image of the first type by applying the acquired second depth image and a second surface normal image corresponding to the second depth image to a second neural network; acquiring a first generative adversarial network (GAN) loss related to whether the second depth image is an image generated by the first neural network; acquiring a first cycle consistency loss related to a difference between the third depth image and the first depth image; and training the first neural network based on the first GAN loss and the first cycle consistency loss.

The training of the first neural network may include: acquiring a fifth depth image of the first type by applying a fourth depth image of the second type and a fourth surface normal image corresponding to the fourth depth image to the second neural network; acquiring a sixth depth image of the second type by applying the acquired fifth depth image and a fifth surface normal image corresponding to the fifth depth image to the first neural network; acquiring a second GAN loss related to whether the fifth depth image is an image generated by the second neural network; acquiring a second cycle consistency loss related to a difference between the sixth depth image and the fourth depth image; and training the first neural network and the second neural network based on the first GAN loss, the second GAN loss, the first cycle consistency loss, and the second cycle consistency loss.

The training method may further include: acquiring a first identity (ID) loss related to a difference between the first depth image and a depth image acquired by applying the first depth image and the first surface normal image to the second neural network; acquiring a second ID loss related to a difference between the fourth depth image and a depth image acquired by applying the fourth depth image and the fourth surface normal image to the first neural network; and training the first neural network and the second neural network further based on the first ID loss and the second ID loss.

The training method may further include: training the first neural network and the second neural network further based on a first range preserving loss for limiting a difference between the first depth image and the second depth image, and a second range preserving loss for limiting a difference between the fourth depth image and the fifth depth image.

The training method may further include: training the second neural network based on a loss for discriminating a difference between the fourth depth image and the fifth depth image and a difference between the fourth depth image and a real depth image of the first type corresponding to the fourth depth image.

The first neural network may include a pre-trained neural network trained to generate a depth image of the second type by changing a depth image of the first type in a first direction. The second neural network may include a pre-trained neural network trained to generate a depth image of the first type by changing a depth image of the second type in a second direction opposite to the first direction.

A depth image of the first type may include a depth image with noise. A depth image of the second type may include a depth image that does not contain noise. The first neural network may be configured to generate a depth image having noise removed by removing noise from an input depth image. The second neural network may be configured to generate a depth image having noise added by adding noise to another input depth image.

In another general aspect, a non-transitory computer-readable storage medium stores instructions that, when executed by a processor, cause the processor to perform the method described above.

In another general aspect an image processing apparatus includes: at least one processor configured to generate a first surface normal image including surface normal vectors corresponding to pixels of a first depth image, apply the first depth image and the first surface normal image to a first neural network, and acquire a second depth image by changing the first depth image using the first neural network. The first neural network may be configured to generate the second depth image having an improved quality compared to the first depth image, based on an embedding vector that includes a feature of the first depth image and a feature of the first surface normal image.

The first neural network may be further configured to remove noise included in the first depth image and increase a sharpness of the first depth image.

The first depth image may include a time-of-flight (TOF) image.

The processor may be further configured to generate a second surface normal image including surface normal vectors corresponding to pixels corresponding to the second depth image, apply the second depth image and the second surface normal image to a second neural network, and acquire a third depth image by changing the second depth image using the second neural network. The second neural network may be configured to generate the third depth image having a degraded quality compared to the second depth image, based on an embedding vector that includes a feature of the second depth image and a feature of the second surface normal image.

The processor may be further configured to generate training data by pairing the second depth image and the third depth image.

The first neural network and the second neural network may be trained based on a cycle-generative adversarial network (GAN) training method.

In another general aspect, an apparatus with image processing includes at least one processor configured to: acquire a second depth image having weak noise by applying a first depth image having strong noise and a first surface normal image corresponding to the first depth image to a first neural network; acquire a third depth image having strong noise by applying the acquired second depth image and a second surface normal image corresponding to the second depth image to a second neural network; acquire a first generative adversarial network (GAN) loss related to whether the second depth image is an image generated by the first neural network; acquire a first cycle consistency loss related to a difference between the third depth image and the first depth image; and train the first neural network based on the first GAN loss and the first cycle consistency loss.

The training of the first neural network may include: acquiring a fifth depth image having strong noise by applying a fourth depth image having weak noise and a fourth surface normal image corresponding to the fourth depth image to the second neural network; acquiring a sixth depth image having weak noise by applying the acquired fifth depth image and a fifth surface normal image corresponding to the fifth depth image to the first neural network; acquiring a second GAN loss related to whether the fifth depth image is an image generated by the second neural network; acquiring a second cycle consistency loss related to a difference between the sixth depth image and the fourth depth image; and training the first neural network and the second neural network based on the first GAN loss, the second GAN loss, the first cycle consistency loss, and the second cycle consistency loss.

The at least one processor may be further configured to: acquire a first identity (ID) loss related to a difference between the first depth image and a depth image acquired by applying the first depth image and the first surface normal image to the second neural network; acquire a second ID loss related to a difference between the fourth depth image and a depth image acquired by applying the fourth depth image and the fourth surface normal image to the first neural network; and train the first neural network and the second neural network further based on the first ID loss and the second ID loss.

The at least one processor may be further configured to train the first neural network and the second neural network further based on a first range preserving loss for limiting a difference between the first depth image and the second depth image, and a second range preserving loss for limiting a difference between the fourth depth image and the fifth depth image.

The at least one processor may be further configured to train the second neural network based on a loss for discriminating a difference between the fourth depth image and the fifth depth image and a difference between the fourth depth image and a real depth image of the first type corresponding to the fourth depth image.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

As used herein, the singular forms "a", "an", and "the" are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Unless otherwise defined, all terms including technical or scientific terms used herein have the same meaning as commonly understood by one of ordinary skill in the art to which this disclosure pertains consistent with and after an understanding of the present disclosure. It will be further understood that terms, such as those defined in commonly-used dictionaries, should be interpreted as having a meaning that is consistent with their meaning in the context of the relevant art and are not to be interpreted in an idealized or overly formal sense unless expressly so defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1:
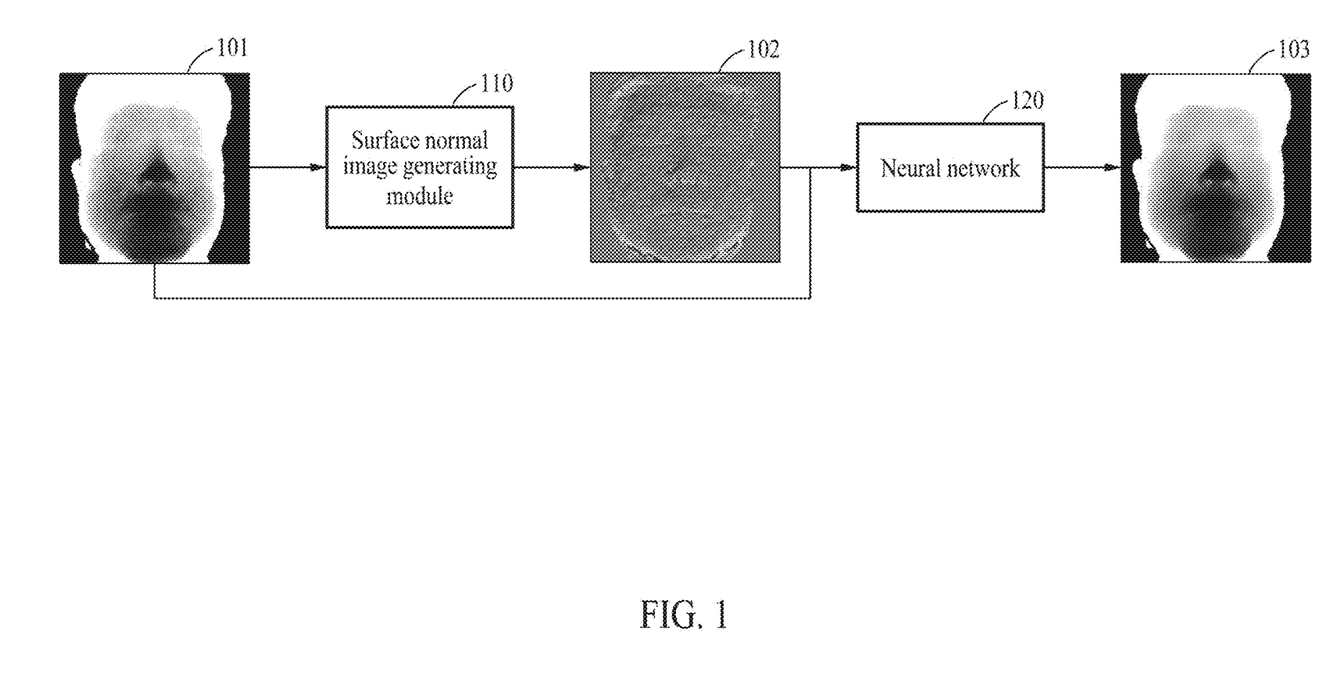
FIG. 1 illustrates an example of an image processing system for acquiring an enhanced depth image.

FIG. 1 illustrates an example of an image processing system for acquiring an enhanced depth image.

Referring to FIG. 1, an image processing system may include, for example, a surface normal image generating module 110 and a neural network 120. The surface normal image generating module 110 may generate a surface normal image 102 corresponding to an input depth image 101. The neural network 120 may receive the input depth image 101 and the surface normal image 102 corresponding to the input depth image 101 as an input, and generate an enhanced depth image 103.

A depth image is an image including depth information associated with a distance from a viewpoint to an object surface, and is a three-dimensional (3D) image including depth information in addition to two-dimensional (2D) position information for each pixel constituting the image. The depth image may be, for example, an image acquired using a time of flight (TOF) sensor camera providing a pixel-by-pixel depth value for a captured subject based on a TOF that an optical signal emitted to the subject is reflected at the subject and then turned back (hereinafter, referred to as a TOF image) or an image acquired using a laser scanner (hereinafter, referred to as an LS image). The TOF image may be generated by measuring depth information more quickly compared to the LS image. However, when compared to the LS image, the TOF image has a larger error in depth measurement and includes relatively strong noise due to the error in depth measurement and the like. The LS image is an image generated by precisely measuring a depth and, thus, has no or little noise in contrast to the TOF image. A depth image that is input to the image processing system to acquire an enhanced depth image may correspond to a noisy depth image such as the TOF image. Hereinafter, the depth image may also be referred to as simply an image.

The surface normal image generating module 110 may calculate a surface normal vector corresponding to each pixel of the input depth image 101, and image the calculated surface normal vectors, thereby generating the surface normal image 102 corresponding to the input depth image 101. A surface normal image corresponding to a depth image is an image obtained by imaging surface normal vectors corresponding to pixels of the depth image. The surface normal vector refers to a unit vector perpendicular to a tangent plane of a point on a surface. The surface normal image generating module 110 may acquire a surface normal vector by calculating a tangent plane of each pixel based on the depth information of the input depth image 101 and image surface normal vectors of pixels of the input depth image 101, thereby generating the surface normal image 102.

The neural network 120 may correspond to a learning model that receives the input depth image 101 and the surface normal image 102 corresponding to the input depth image 101 as an input and generates the enhanced depth image 103. The depth image 101 and the surface normal image 102 may be concatenated and then input to the neural network 120. The neural network 120 may generate the enhanced depth image 103 based on embedding vectors including a feature of the input depth image 101 and a feature of the surface normal image 102. In other words, the neural network 120 may change a feature of the input depth image 101 based on features extracted by encoding the depth image 101 and the surface normal image 102, decode the changed feature, and generate the enhanced depth image 103.

The enhanced depth image 103 is an image to which the input depth image 101 is changed, and may correspond to an image in which some features of the input depth image 101 are changed by reflecting the feature extracted from the surface normal image 102 in the neural network 120. The enhanced depth image 103 may correspond to an image changed to improve some features of the input depth image 101, that is, an image of which a quality is improved compared to the input depth image 101. For example, the enhanced depth image 103 may correspond to an image in which noise of the input depth image 101 is removed or a quality such as sharpness is improved.

For example, the neural network 120 may correspond to a learning model configured as a convolutional neural network (CNN). The neural network 120 may include a plurality of layers. A parameter between the layers may be determined through learning. In the neural network 120, a computational operation may be performed on the input depth image 101 and the surface normal image 102 based on the parameter between the layers so that the enhanced depth image 103 is generated.

Although not shown in FIG. 1, in addition to the neural network 120, the image processing system may further include another neural network that changes the depth image in a reversed manner to the neural network 120. When the neural network 120 is a network that generates an image having an improved quality compared to an input image, the other neural network may correspond to a network that generates a depth image having a degraded quality compared to an input depth image. Hereinafter, to distinguish between the neural network 120 and another neural network, the neural network 120 that generates an enhanced depth image may be referred to as a first neural network, and a neural network that generates a depth image in the reversed manner to the first neural network may be referred to as a second neural network.

Like the first neural network, the second neural network may receive a depth image and a surface normal image corresponding to the depth image as an input. The second neural network may generate a depth image with a degraded quality based on an embedding vector including a feature of the input depth image and a feature of the input surface normal image. At this time, the second neural network may change some features of the input depth image by reflecting the feature extracted from the input surface normal image. The feature of the input depth image may be changed in a direction opposite to a direction in which the input depth image is changed in the first neural network. The second neural network may correspond to a concept of an inverse function of the first neural network.

For example, the first neural network may generate a depth image to which the input depth image is changed in a first direction. In this example, the first direction is a direction in which a first type depth image is changed to a second type depth image. Meanwhile, the second neural network may generate a depth image to which the input depth image is changed in a second direction opposite to the first direction. The second direction may correspond to a direction in which the second type depth image is changed to the first type depth image.

For example, a first type may correspond to an image with strong noise and a second type may correspond to a clean image free of noise. In this example, the first neural network may correspond to a network trained to generate a de-noised image from a depth image with strong noise. Also, the second neural network may correspond to a network trained to generate an image that simulates noise from a clean depth image.

For example, the first neural network and the second neural network may be trained based on a cycle-generative adversarial network (GAN) learning method. The first neural network may be trained such that the depth image generated by the first neural network is restored to the depth image input to the first neural network by the second neural network. The second neural network may be trained such that the depth image generated by the second neural network is restored to the depth image input to the second neural network by the first neural network. A method of training the first neural network and the second neural network will be described later.

A depth image in which two or more features are changed by the first neural network and the second neural network may be generated. For example, the first neural network may output a depth image obtained by removing noise from the input depth image and improving sharpness. In this example, the second neural network may output a depth image obtained by adding noise to the input depth image and reducing the sharpness. In other words, the first neural network and the second neural network may correspond to networks that generate images by respectively changing two or more features of the input depth images in different directions. The feature(s) of the depth images changed by the first neural network and the second neural network may be related to features(s) of the surface normal images input together with the depth images.

In the following description, the first neural network that outputs an enhanced depth image may also be referred to as an enhancement CNN, and the second neural network that outputs a depth image changed in an opposite direction compared to the first neural network may also be referred to as a noise simulation CNN. The first type depth image may be an image with strong noise, and the second type depth image may be a clean image with weak noise. The enhancement CNN may correspond to a learning model that receives a TOF image with strong noise and a surface normal image corresponding to the TOF image and outputs a clean de-noised depth image. The noise simulation CNN may be a learning model that receives a clean LS image with weak noise and a surface normal image corresponding to the LS image and outputs a noisy depth image.

Figure 2:
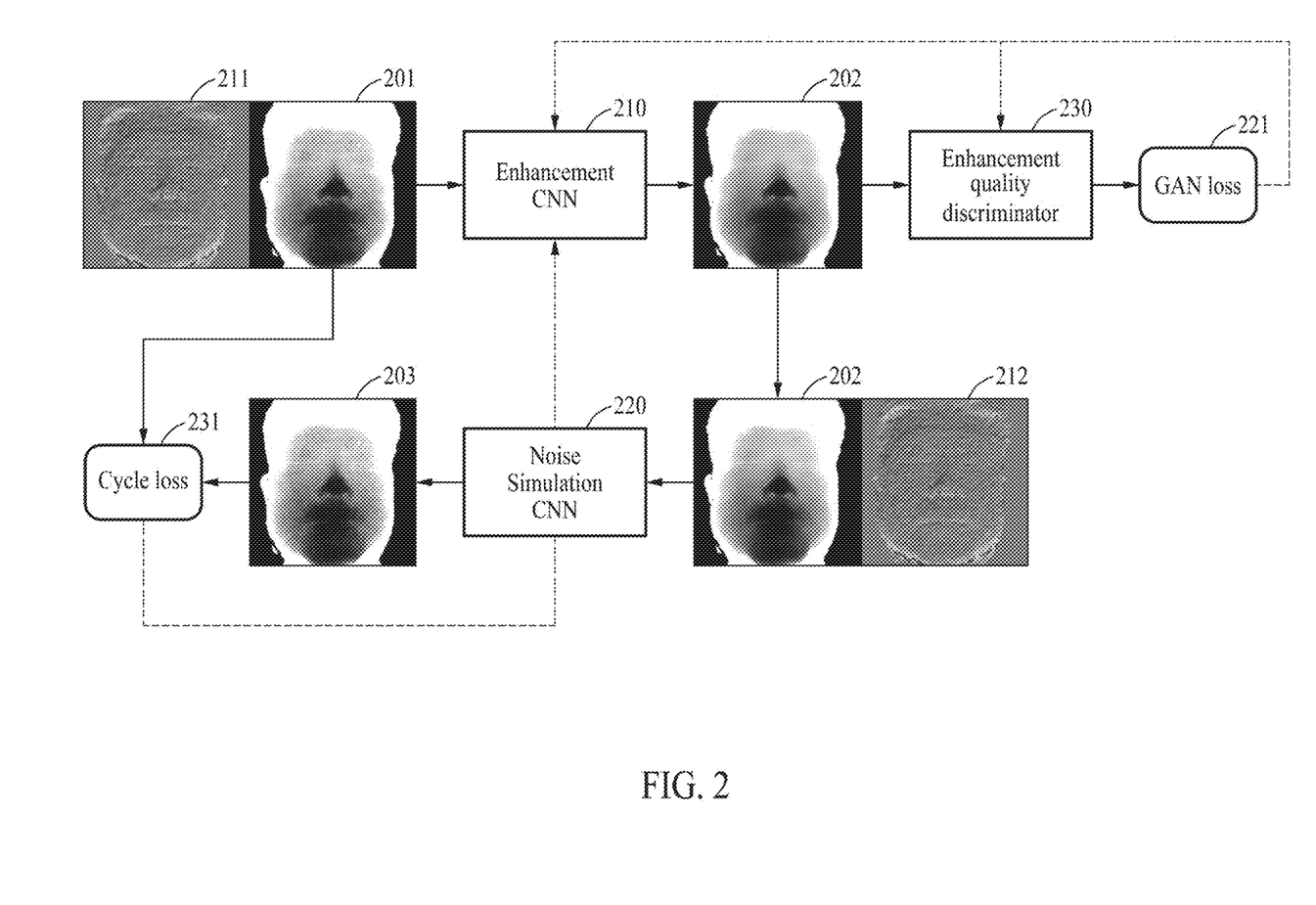
FIG. 2 illustrates an example of a training method of a neural network for acquiring an enhanced depth image.

FIG. 2 illustrates an example of a training method of a neural network for acquiring an enhanced depth image.

Referring to FIG. 2, a training method of a neural network for acquiring an enhanced depth image may include an operation of acquiring a second depth image 202 of a second type by applying a first depth image 201 of a first type and a first surface normal image 211 corresponding to the first depth image 201 to a first neural network (hereinafter, referred to as an "enhancement CNN") 210, an operation of acquiring a third depth image 203 of the first type by applying the acquired second depth image 202 and a second surface normal image 212 corresponding to the second depth image 202 to a second neural network 220, an operation of acquiring a GAN loss 221 related to whether the second depth image 202 is an image generated by the first neural network 210, an operation of acquiring a cycle consistency loss 231 related to a difference between the third depth image 203 and the first depth image 201, and an operation of training the first neural network 210 based on the GAN loss 221 and the cycle consistency loss 231.

An enhancement CNN, for example, the first neural network 210 may be trained based on the GAN loss 221. The GAN loss 221 is a loss related to whether a predetermined depth image is an image generated in the enhancement CNN 210, and may be acquired based on a result of verifying whether a predetermined depth image is a de-noised image generated in the enhancement CNN 210 or a clean image free of noise.

An enhancement quality discriminator 230 is a discriminator corresponding to the enhancement CNN 210 that is a generator and may correspond to a network that verifies an input depth image is a real clean depth image captured by a laser scanner or a fake clean depth image generated through the enhancement CNN 210. The real clean depth image may be a clean depth image that does not inherently contain noise, instead of an image obtained through processing such as noise removal. The fake clean depth image may be a depth image that is made into a clean image by performing noise removal processing.

The enhancement quality discriminator 230 may be trained to determine that an input image is real when the input image is a real clean depth image. Also, the enhancement quality discriminator 230 may be trained to determine that an input image is fake when the input image is a fake clean depth image generated by applying a TOF image to the enhancement CNN 210. Based on an output of the enhancement quality discriminator 230, a GAN loss function 221 may be configured. Based on a GAN loss, the enhancement CNN 210, which is the generator, and the discriminator 230 may be trained.

The generator 210 and the discriminator 230 may be trained while competing adversarially based on the GAN loss 221. Based on the GAN loss 221, the discriminator 230 may be trained to distinguish between the real clean image and the fake clean image generated in the generator 210, and the generator 210 may be trained to generate a depth image close to the real clean depth image.

The enhancement CNN 210 may be trained based on the cycle consistency loss 231. The cycle consistency loss 231 is a loss for controlling the enhancement CNN 210 that changes the depth image such that the second depth image 202 generated in the enhancement CNN 210 is restored to the first depth image 201 that is the original image. Also, the cycle consistency loss 231 may be acquired based on a difference between the third depth image 203 that is the output image of the noise simulation CNN 220 and the first depth image 201 that is the input image of the enhancement CNN 210, which may be acquired by inputting the second depth image 202 output from the enhancement CNN 210 into the noise simulation CNN 220.

The noise simulation CNN 220 may receive the second depth image 202 output from the enhancement CNN and the second surface normal image 212 corresponding to the second depth image 202 and output the third depth image 203 that is a noisy image. Although not shown in FIG. 2, the second depth image 202 output from the enhancement CNN 210 may be input to a surface normal image generating module, so that the second surface normal image 212 is acquired based on depth information of the second depth image 202. In other words, the training method may further include an operation of calculating a surface normal vector corresponding to each pixel of the second depth image 202 output from the enhancement CNN 210 and imaging the calculated surface normal vector, thereby acquiring the second surface normal image 212.

FIG. 2 illustrates a process of training the enhancement CNN 210 based on a cycle consistency loss (hereinafter, also referred to as a "first cycle loss") 231 acquired by inputting, into the noise simulation CNN 220, the second depth image 202 generated by inputting a GAN loss (hereinafter, also referred to as a "first GAN loss") 221 of the enhancement CNN 210 and the first depth image 201 into the enhancement CNN 210 in advance. The training method may include an operation of training the noise simulation CNN 220 in addition to the enhancement CNN 210. The training method may include an operation of training the noise simulation CNN 220 based on a cycle consistency loss (hereinafter, also referred to as a "second cycle loss") acquired by inputting, into the enhancement CNN 210, an output image generated by inputting, into the noise simulation CNN 220, a GAN loss (hereinafter, also referred to as a "second GAN loss") of the noise simulation CNN 220 and the depth image in advance. A related example will be described with reference to FIG. 3.

Figure 3:
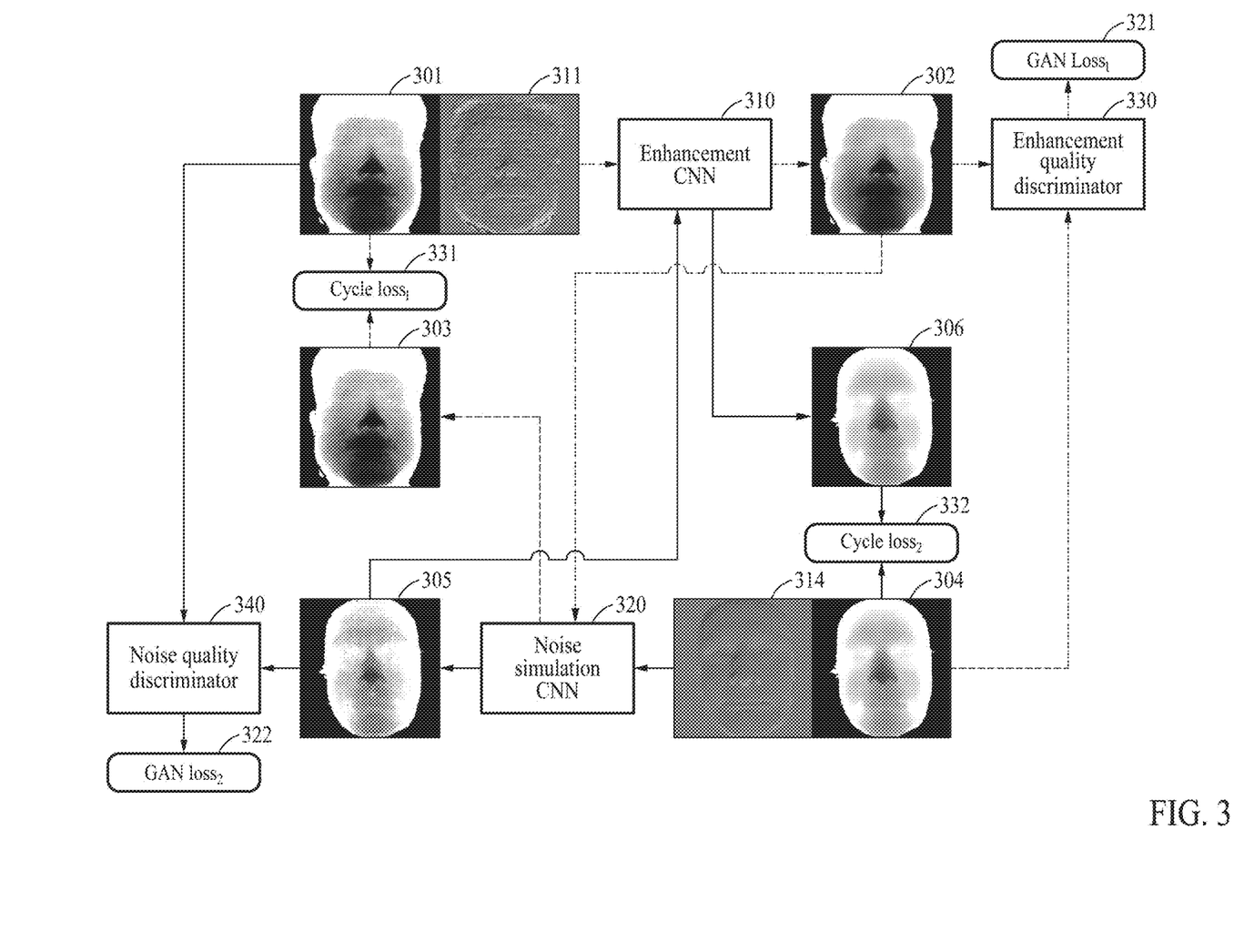
FIG. 3 illustrates an example of a training method of an enhancement convolutional neural network (CNN) and a noise simulation CNN.

FIG. 3 illustrates an example of a training method of an enhancement CNN and a noise simulation CNN.

Referring to FIG. 3, an enhancement CNN 310 and a noise simulation CNN 320 may be trained based on a first GAN loss 321, a second GAN loss 322, a first cycle loss 331, and a second cycle loss 332 according to a cycle-GAN learning method. In FIG. 3, a first depth image 301, a first surface normal image 311, a second depth image 302, a third depth image 303, and an enhancement quality discriminator 330 respectively correspond to the first depth image 201, the first surface normal image 211, the second depth image 202, the third depth image 203, and the enhancement quality discriminator 230 described in the embodiment of FIG. 2.

To acquire a second GAN loss and a second cycle loss, a training method may include an operation of acquiring a fifth depth image 305 of a first type by applying a fourth depth image 304 of a second type and a fourth surface normal image 314 corresponding to the fourth depth image 304 to a second neural network 320 (hereinafter, referred to as a "noise simulation CNN"), an operation of acquiring a sixth depth image 306 of the second type by applying the acquired fifth depth image 305 and a fifth surface normal image corresponding to the fifth depth image 305 to a first neural network 310 (hereinafter, referred to as an "enhancement CNN"), an operation of acquiring the second GAN loss 322 related to whether the fifth depth image 305 is an image generated by the noise simulation network 320, and an operation of acquiring the second cycle loss 332 related to a difference between the sixth depth image 306 and the fourth depth image 304.

A noise simulation CNN, for example, the second neural network 320, may be trained based on the second GAN loss 322. The second GAN loss 322 is a loss related to whether a predetermined depth image is an image generated in the noise simulation CNN 320, and may be acquired based on a result of verifying whether a predetermined depth image is a noisy image generated in the noise simulation CNN 320 or an image that inherently contains noise.

A noise quality discriminator 340 is a discriminator corresponding to the noise simulation CNN 320, which is a generator. The discriminator 340 may correspond to a network that verifies whether an input depth image is a real noisy image captured by a TOF camera or a fake noisy image generated through the noise simulation CNN 320. The real noisy depth image may be a depth image that inherently contains noise, instead of an image obtained through processing such as noise simulation. The fake noisy image may be a depth image that is made into a strong noisy image by performing noise simulation processing.

The noise quality discriminator 340 may be trained to determine that an input image is real when the input image is a real noisy image. Also, the noise quality discriminator 340 may be trained to determine that an input image is fake when the input image is a fake noisy image generated by applying an LS image to the noise simulation CNN 320. Based on an output of the noise quality discriminator 340, the second GAN loss 322 may be configured. Based on the second GAN loss 322, the noise simulation CNN 320, which is the generator, and the noise quality discriminator 340 may be trained.

The generator 320 and the discriminator 340 may be trained while competing adversarially based on the second GAN loss 322. Based on the second GAN loss 322, the discriminator 340 may be trained to distinguish between the real noisy image and the fake noisy image generated in the generator 320, and the generator 320 may be trained to generate a depth image close to a real noisy depth image.

The noise simulation CNN 320 may be trained based on the second cycle loss 332. The second cycle loss 332 is a loss for controlling the noise simulation CNN 320 that changes a depth image such that the fifth depth image 305 generated in the noise simulation CNN 320 is restored to the fourth depth image 304 that is the original image. Also, the second cycle loss 332 may be acquired based on a difference between the sixth depth image 306 that is the output image of the enhancement CNN 310 and the fourth depth image 304 that is the input image of the noise simulation CNN 320, which may be acquired by inputting the fifth depth image 305 output from the noise simulation CNN 320 into the enhancement CNN 310.

Although not shown in FIG. 3, the enhancement CNN 310 may receive the fifth depth image 305 output from the noise simulation CNN 320 and a surface normal image corresponding to the fifth depth image 305 as an input and output the sixth depth image 306 in which noise is removed. The fifth depth image 305 output from the noise simulation CNN 320 may be input to the surface normal image generating module, so that a surface normal image is acquired based on depth information of the fifth depth image 305. In other words, the training method may further include an operation of calculating a surface normal vector corresponding to each pixel of the fifth depth image 305 output from the noise simulation CNN 320 and imaging the surface normal vectors, thereby acquiring a surface normal image.

Figure 4A:
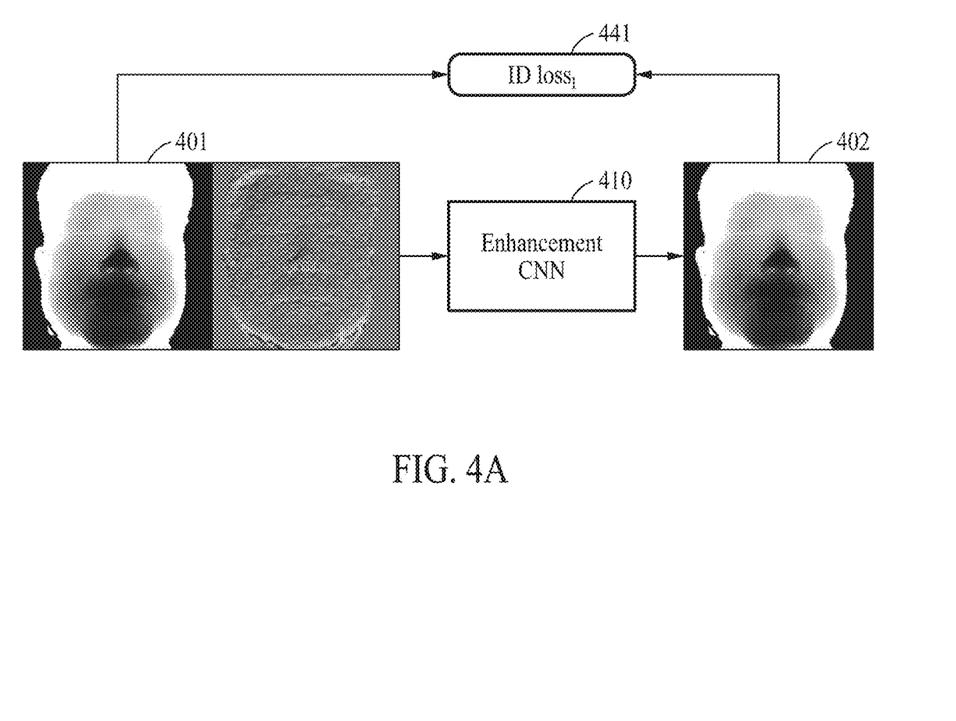
FIGS. 4A and 4B illustrate examples of loss functions for training an enhancement CNN and a noise simulation CNN, respectively.
Figure 4B:
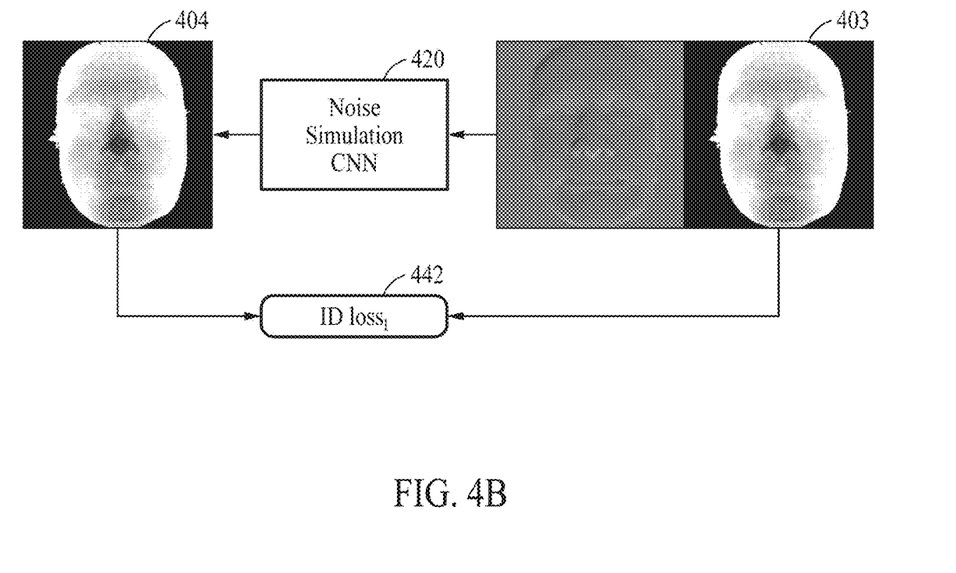

FIGS. 4A and 4B illustrate examples of loss functions for training an enhancement CNN and a noise simulation CNN.

An enhancement CNN and a noise simulation CNN may be trained based on an identity (ID) loss. The ID loss is for providing a stable guideline in image generation. Also, when data corresponding to a predetermined type is input into a neural network that outputs a result of converting input data to data of the predetermined type, the ID loss is a loss for training the neural network to output the same data as the input data.

Referring to FIG. 4A, a first ID loss 441 is a loss for training an enhancement CNN 410 to generate an output image 402 the same as a clean image 401 in response to the clean image 401 being input to the enhancement CNN 410 that outputs a clean depth image. The first ID loss 441 may be acquired based on a difference between the clean image 401 input to the enhancement CNN 410 and the output image 402. Based on the first ID loss 441, the enhancement CNN 410 may be trained to reduce the difference between the input clean image 401 and the generated output image 402.

Referring to FIG. 4B, a second ID loss 442 is a loss for training the noise simulation CNN 420 to output an output image 404 the same as a noisy image 403 in response to the noisy image 403 being input to the noise simulation CNN 420 that outputs a noisy depth image. The second ID loss 442 may be acquired based on a difference between the noisy image 403 input to the noise simulation CNN 420 and the output image 404. Based on the second ID loss 442, the noise simulation CNN 420 may be trained to reduce the difference between the input noisy image 403 and the generated output image 404.

Figure 5:
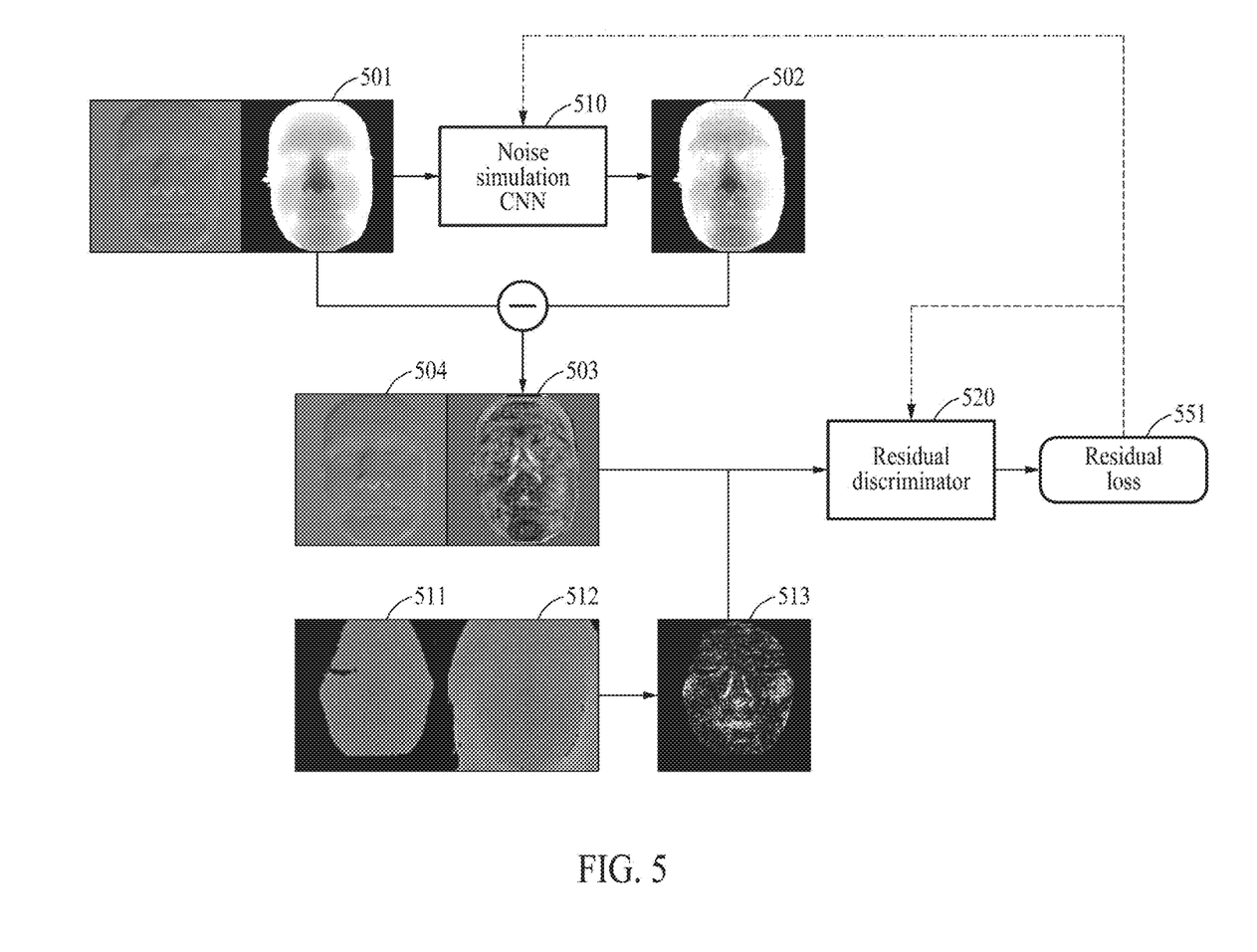
FIG. 5 illustrates an example of a loss function for training a noise simulation CNN.

FIG. 5 illustrates an example of a loss function for training a noise simulation CNN.

Referring to FIG. 5, a noise simulation CNN 510 may be trained based on a residual loss 551. The residual loss 551 may be acquired by a residual discriminator 520 that discriminates a difference value between an input image 501 and an output image 502 of the noise simulation CNN 510.

The residual discriminator 520 may correspond to a network that discriminates a difference value 503 between the input image 501 and the output image 502 of the noise simulation CNN and a difference value 513 of a depth image pair included in training data. The depth image pair may be a pair of an LS image 511 and a TOF image 512 simultaneously captured by a laser scanner and a TOF camera and aligned. The difference value 513 of the depth image pair may be a value of a difference between the LS image 511 and the TOF image 512 that form the depth image pair.

The residual discriminator 520 may determine whether input data is a difference between an input image and an output image of the noise simulation CNN 510 or a difference value of a depth image pair included in training data. Based on an output of the residual discriminator 520, a residual loss function 551 may be constructed. Based on the residual loss, the residual discriminator 520 may be trained to distinguish between the difference value between the input image and the output image of the noise simulation CNN and the difference value of the depth image pair, and the noise simulation CNN 510 may be trained to generate an output image close to the difference value of the depth image pair from the input image. In an example, the residual discriminator 520 may receive a surface normal image 504 of the input image 501 along with the difference value 503 between the input image and the output image of the noise simulation CNN 510.

Although FIG. 5 illustrates that the noise simulation CNN is trained based on the residual loss as an example, even an enhancement CNN may be trained based on the residual loss. The residual loss used for training the enhancement CNN may be acquired by a residual discriminator that discriminates a difference value between an input image and an output image of the enhancement CNN. The residual loss used for training the enhancement CNN may correspond to a network that distinguishes between the difference between the input image and the output image of the enhancement CNN and the difference value of the depth image pair included in the training data.

The enhancement CNN and the noise simulation CNN may be trained based on a range preserving loss. The range preserving loss is a loss for limiting a difference between an input image and an output image and may be acquired based on a difference between the input image and the output image. For example, the enhancement CNN may be trained based on a range preserving loss acquired by a mean square error of the input image and the output image of the enhancement CNN. Also, the noise simulation CNN may be trained based on a range preserving loss acquired by a mean square error of the input image and the output image of the noise simulation CNN.

Table 1 shows a design example of loss functions used in the training method.

TABLE 1

| | |
|---|---|
| GAN loss | $D_1(G_2(B), A) + D_2(G_1(A), B)$ |
| Cycle loss | $L_1loss(G_2(G_1(A)), A) + L_1loss(G_1(G_2(B)), B)$ |
| Identity loss | $L_1loss(G_2(A), A) + L_1loss(G_1(B), B)$ |
| Residual loss | $D_R(B - G_2(B), C)$ |
| Range Preserving loss | $MSE(G_1(A), A) + MSE(G_2(B), B)$ |

In Table 1, A denotes a first type depth image (for example, the TOF image), B denotes a second type depth image (for example, the LS image), C denotes a difference value of a pair of the first type and second type depth images (for example, a difference value of a pair formed by the TOF image and the LS image), G1 denotes a first neural network (for example, the enhancement CNN), G2 denotes a second neural network (for example, the noise simulation CNN), D1 denotes a first discriminator (for example, an enhancement quality discriminator) corresponding to the first neural network that is a generator, D2 denotes a second discriminator (for example, a noise quality discriminator) corresponding to the second neural network that is a generator, and DR denotes the residual discriminator.

Figure 6A:
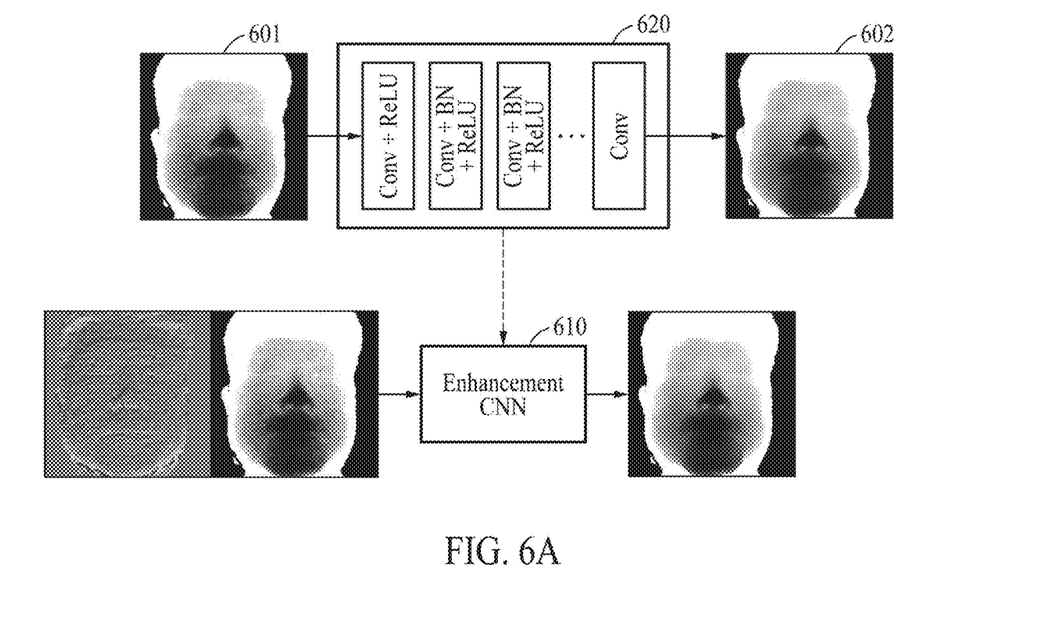
FIGS. 6A and 6B illustrate examples of methods of training an enhancement CNN and a noise simulation CNN using pre-trained models.
Figure 6B:
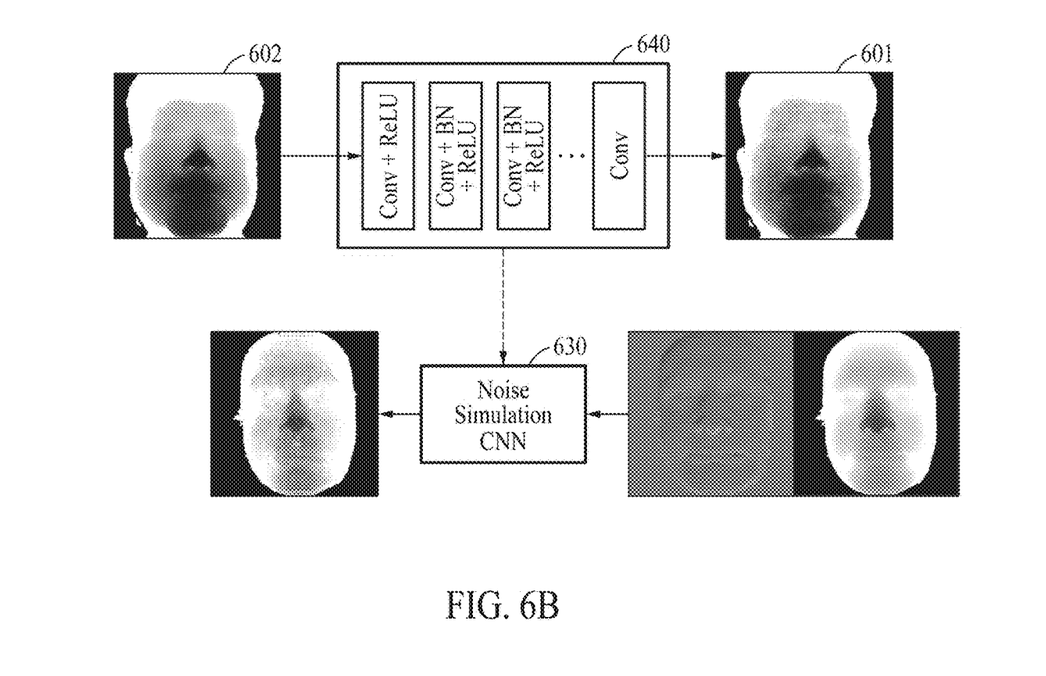

FIGS. 6A and 6B illustrate examples of methods of training an enhancement CNN and a noise simulation CNN using pre-trained models.

An enhancement CNN and a noise simulation CNN may be trained using a semi-supervised learning method due to a lack of LS images used as ground truth (GT) data of a TOF image for training. For example, the enhancement CNN and the noise simulation CNN may be trained using a trained CNN model according to the above-described cycle-GAN learning method. In this example, the trained CNN model may be trained in advance using, as training data, a TOF depth image and a depth image de-noised by a weighted least squares (WLS) filter.

Referring to FIGS. 6A and 6B, an enhancement CNN 610 may use a CNN 620 that is trained to generate a depth image 602 obtained by removing noise from the TOF image 601 through the WLS filter, as a pre-trained model. A noise simulation CNN 630 may use, as a pre-trained model, a CNN 640 trained to generate the TOF image 601 in which noise has not been removed, from the image 602 de-noised by the WLS filter. In other words, the enhancement CNN 610 and the noise simulation CNN 630 that have not been trained yet according to the cycle-GAN method may correspond to the CNN models 620 and 640 trained using the TOF image 601 and the depth image 602 de-noised by the WLS filter as the training data.

The enhancement CNN 610 trained according to the above-described training method may receive a TOF image with strong noise and a surface normal image corresponding to the TOF image and generate an enhanced depth image. The enhancement CNN 610 may generate a depth image with excellent noise removal effect and sharpness improving effect. In addition, the enhancement CNN 610 may generate a depth image in which multipath distortion is reduced. For example, the enhancement CNN 610 may generate an image by reducing the multipath distortion in a portion with a large curvature in an input image.

The noise simulation CNN 630 trained according to the above-described training method may be used for generating training data of a neural network related to noise removal by generating a noisy depth image corresponding to a clean depth image.

Figure 7:
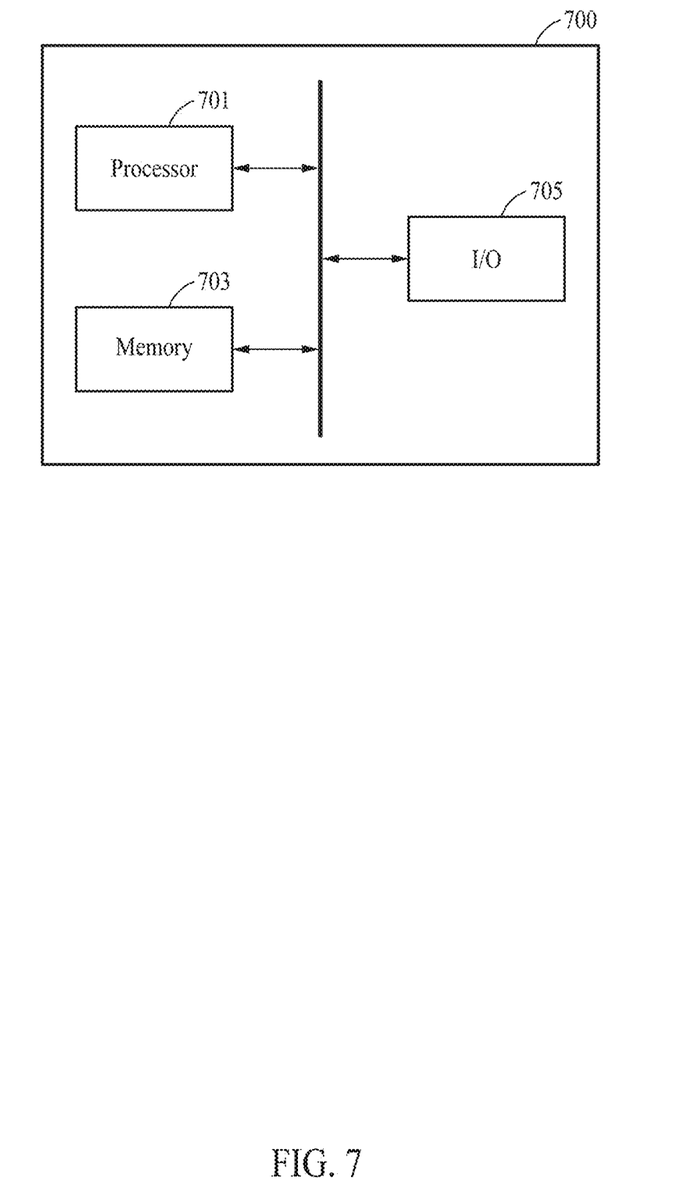
FIG. 7 illustrates an example of an image processing apparatus.

FIG. 7 illustrates an example of an image processing apparatus.

Referring to FIG. 7, an image processing apparatus 700 may include, for example, a processor 701, a processor 703, and an input and output (I/O) device 705.

The image processing apparatus 700 may be an apparatus that performs the above-described image processing method or training method and may include a server and a user device, for example, a mobile phone, a computer, and the like. The processor 701 may perform at least one of the above-described methods described with reference to FIGS. 1 through 6B. The memory 703 may store information associated with an image processing method or a training method, or store a program in which the aforementioned image processing method or training method is implemented. The memory 703 may be a volatile memory or a non-volatile memory.

The processor 701 may execute the program and control the image processing apparatus 700. A code of the program executed by the processor 701 may be stored in the memory 703. The image processing apparatus 700 may be connected to an external device, for example, a personal computer or a network, through the I/O device 705 and perform data exchange.

The surface normal image generating model 110, the neural network 120, the enhancement CNNs 210, 310, 410, 510, and 610, the noise simulation CNNs, 220, 320, 420, 520, and 630, the enhancement quality discriminators 230 and 330, the noise quality discriminator 340, the CNNs 620 and 640, the processor 701, the memory 703, the I/O device 705, the neural networks, the CNNs, the processors, and the memories described herein with respect to FIGS. 1 to 7 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented image processing method, comprising:
    generating a first surface normal image comprising surface normal vectors corresponding to pixels of a first depth image; and
    generating, using a first neural network, a second depth image by applying the first depth image and the first surface normal image as input to the first neural network, where the first neural network generates the second depth image by changing the first depth image based on an embedding vector that comprises a feature of the first depth image and a feature of the first surface normal image such that the second depth image has an improved quality compared to the first depth images, wherein the first neural network removes noise included in the first depth image and increases a sharpness of the first depth image.

2. The method of claim 1, wherein the first depth image comprises a time-of-flight (TOF) image.

3. The method of claim 1, further comprising:
generating a second surface normal image comprising surface normal vectors corresponding to pixels corresponding to the second depth image; and
applying the second depth image and the second surface normal image to a second neural network, and acquiring a third depth image by changing the second depth image using the second neural network,
wherein the second neural network generates the third depth image having a degraded quality compared to the second depth image, based on an embedding vector that comprises a feature of the second depth image and a feature of the second surface normal image.

4. The method of claim 3, further comprising:
generating training data by pairing the second depth image and the third depth image.

5. The method of claim 3, wherein the first neural network and the second neural network are trained based on a cycle-generative adversarial network (GAN) training method.

6. A non-transitory computer-readable storage medium storing instructions that, when executed by a processor, cause the processor to perform the method of claim 1.

7. A training method, comprising:
acquiring a second depth image of a second type by applying a first depth image of a first type and a first surface normal image corresponding to the first depth image to a first neural network;
acquiring a third depth image of the first type by applying the acquired second depth image and a second surface normal image corresponding to the second depth image to a second neural network;
acquiring a first generative adversarial network (GAN) loss related to whether the second depth image is an image generated by the first neural network;
acquiring a first cycle consistency loss related to a difference between the third depth image and the first depth image; and
training the first neural network based on the first GAN loss and the first cycle consistency loss, wherein the trained first neural network generates an output depth image by changing an input depth image based on an embedding vector that comprises a feature of the input depth image and a feature of a corresponding surface normal image so that the output depth image has an improved quality compared to the input depth image,
wherein the corresponding surface normal image is generated corresponding to pixels of the input depth image, and
wherein the first neural network removes noise included in the input depth image and increases a sharpness of the input depth image.

8. The training method of claim 7, wherein the training of the first neural network comprises:
acquiring a fifth depth image of the first type by applying a fourth depth image of the second type and a fourth surface normal image corresponding to the fourth depth image to the second neural network;
acquiring a sixth depth image of the second type by applying the acquired fifth depth image and a fifth surface normal image corresponding to the fifth depth image to the first neural network;
acquiring a second GAN loss related to whether the fifth depth image is an image generated by the second neural network;
acquiring a second cycle consistency loss related to a difference between the sixth depth image and the fourth depth image; and
training the first neural network and the second neural network based on the first GAN loss, the second GAN loss, the first cycle consistency loss, and the second cycle consistency loss.

9. The training method of claim 8, further comprising:
acquiring a first identity (ID) loss related to a difference between the first depth image and a depth image acquired by applying the first depth image and the first surface normal image to the second neural network;
acquiring a second ID loss related to a difference between the fourth depth image and a depth image acquired by applying the fourth depth image and the fourth surface normal image to the first neural network; and
training the first neural network and the second neural network further based on the first ID loss and the second ID loss.

10. The training method of claim 8, further comprising:
training the first neural network and the second neural network further based on a first range preserving loss for limiting a difference between the first depth image and the second depth image, and a second range preserving loss for limiting a difference between the fourth depth image and the fifth depth image.

11. The training method of claim 8, further comprising:
training the second neural network based on a loss for discriminating a difference between the fourth depth image and the fifth depth image and a difference between the fourth depth image and a real depth image of the first type corresponding to the fourth depth image.

12. The training method of claim 7, wherein
the first neural network comprises a pre-trained neural network trained to generate a depth image of the second type by changing a depth image of the first type in a first direction, and
the second neural network comprises a pre-trained neural network trained to generate a depth image of the first type by changing a depth image of the second type in a second direction opposite to the first direction.

13. The training method of claim 7, wherein a depth image of the first type comprises a depth image with noise,
wherein a depth image of the second type comprises a depth image that does not contain noise,
wherein the first neural network is configured to generate a depth image having noise removed by removing noise from an input depth image, and
wherein the second neural network is configured to generate a depth image having noise added by adding noise to another input depth image.

14. A non-transitory computer-readable storage medium storing instructions that, when executed by a processor, cause the processor to perform the method of claim 7.

15. An apparatus with image processing, comprising:
at least one processor;

at least one memory storing instructions, which when executed by the at least one processor configure the at least one processor to:
  generate a first surface normal image comprising surface normal vectors corresponding to pixels of a first depth image; and
  generate, using a first neural network, a second depth image by applying the first depth image and the first surface normal image as input to the first neural network, where the first neural network generates the second depth image by changing the first depth image based on an embedding vector that comprises a feature of the first depth image and a feature of the first surface normal image such that the second depth image has an improved quality compared to the first depth image,
  wherein the first neural network is further configured to remove noise included in the first depth image and increase a sharpness of the first depth image.

16. The apparatus of claim 15, wherein the first depth image comprises a time-of-flight (TOF) image.

17. The apparatus of claim 15, wherein the processor is further configured to:
  generate a second surface normal image comprising surface normal vectors corresponding to pixels corresponding to the second depth image;
  apply the second depth image and the second surface normal image to a second neural network; and
  acquire a third depth image by changing the second depth image using the second neural network, and
  wherein the second neural network is configured to generate the third depth image having a degraded quality compared to the second depth image, based on an embedding vector that comprises a feature of the second depth image and a feature of the second surface normal image.

18. The apparatus of claim 17, wherein the processor is further configured to generate training data by pairing the second depth image and the third depth image.

19. The apparatus of claim 17, wherein the first neural network and the second neural network are trained based on a cycle-generative adversarial network (GAN) training method.

20. An apparatus with image processing, comprising:
at least one processor:
at least one memory storing instructions, which when executed by the at least one processor configure the at least one processor to:
  acquire a second depth image having weak noise by applying a first depth image having strong noise and a first surface normal image corresponding to the first depth image to a first neural network;
  acquire a third depth image having strong noise by applying the acquired second depth image and a second surface normal image corresponding to the second depth image to a second neural network;
  acquire a first generative adversarial network (GAN) loss related to whether the second depth image is an image generated by the first neural network;
  acquire a first cycle consistency loss related to a difference between the third depth image and the first depth image; and
  train the first neural network based on the first GAN loss and the first cycle consistency loss;
  wherein the trained first neural network generates an output depth image by changing an input depth image based on an embedding vector that comprises a feature of the input depth image and a feature of corresponding surface normal image so that the output depth image has an improved quality compared to the input depth image,
    wherein the corresponding surface normal image is generated corresponding to pixels of the input depth image, and
    wherein the first neural network removes noise included in the input depth image and increases a sharpness of the input depth image.

21. The apparatus of claim 20, wherein the training of the first neural network comprises:
  acquiring a fifth depth image having strong noise by applying a fourth depth image having weak noise and a fourth surface normal image corresponding to the fourth depth image to the second neural network;
  acquiring a sixth depth image having weak noise by applying the acquired fifth depth image and a fifth surface normal image corresponding to the fifth depth image to the first neural network;
  acquiring a second GAN loss related to whether the fifth depth image is an image generated by the second neural network;
  acquiring a second cycle consistency loss related to a difference between the sixth depth image and the fourth depth image; and
  training the first neural network and the second neural network based on the first GAN loss, the second GAN loss, the first cycle consistency loss, and the second cycle consistency loss.

22. The apparatus of claim 21, wherein the at least one processor is further configured to:
  acquire a first identity (ID) loss related to a difference between the first depth image and a depth image acquired by applying the first depth image and the first surface normal image to the second neural network;
  acquire a second ID loss related to a difference between the fourth depth image and a depth image acquired by applying the fourth depth image and the fourth surface normal image to the first neural network; and
  train the first neural network and the second neural network further based on the first ID loss and the second ID loss.

23. The apparatus of claim 21, wherein the at least one processor is further configured to train the first neural network and the second neural network further based on a first range preserving loss for limiting a difference between the first depth image and the second depth image, and a second range preserving loss for limiting a difference between the fourth depth image and the fifth depth image.

24. The apparatus of claim 21, wherein the at least one processor is further configured to train the second neural network based on a loss for discriminating a difference between the fourth depth image and the fifth depth image and a difference between the fourth depth image and a real depth image of the first type corresponding to the fourth depth image.

* * * * *